US010212227B1

(12) United States Patent
Jones et al.

(10) Patent No.: US 10,212,227 B1
(45) Date of Patent: *Feb. 19, 2019

(54) SYSTEMS AND METHODS FOR SYNCHRONIZING DATA BETWEEN COMMUNICATION DEVICES IN A NETWORKED ENVIRONMENT

(71) Applicant: OPEN INVENTION NETWORK LLC, Durham, NC (US)

(72) Inventors: Dan Jones, Niwot, CO (US); Todd Vernon, Lafayette, CO (US); Jeffrey Kriese, Castle Rock, CO (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,030

(22) Filed: Aug. 9, 2016

Related U.S. Application Data

(63) Continuation of application No. 14/170,730, filed on Feb. 3, 2014, now Pat. No. 9,413,593, which is a continuation of application No. 12/724,995, filed on Mar. 16, 2010, now Pat. No. 8,645,541, which is a continuation of application No. 12/189,267, filed on Aug. 11, 2008, now Pat. No. 7,693,997, which is a continuation of application No. 10/735,590, filed on Dec. 12, 2003, now Pat. No. 7,426,578.

(51) Int. Cl.
*H04L 29/06* (2006.01)
*H04L 29/08* (2006.01)
*H04L 12/861* (2013.01)

(52) U.S. Cl.
CPC .......... *H04L 67/1095* (2013.01); *H04L 49/90* (2013.01); *H04L 69/28* (2013.01)

(58) Field of Classification Search
CPC   H04L 63/0442; H04L 63/102; H04L 67/1002
See application file for complete search history.

(56) References Cited

U.S. PATENT DOCUMENTS

| 6,151,688 A * | 11/2000 | Wipfel | G06F 11/008 709/224 |
| 2005/0015471 A1 * | 1/2005 | Zhang | H04L 63/0442 709/221 |

* cited by examiner

*Primary Examiner* — Ranodhi Serrao

(57) ABSTRACT

A source communication device comprises a cluster manager to group destination device connections into a plurality of performance clusters. The cluster manager then causes a synchronization mechanism to be generated for each performance cluster. Each synchronization cluster can then allow data to be optimally shared between the source device and destination devices within a given cluster.

17 Claims, 4 Drawing Sheets

SYSTEMS AND METHODS FOR SYNCHRONIZING DATA BETWEEN COMMUNICATION DEVICES IN A NETWORKED ENVIRONMENT

CROSS-REFERENCE TO RELATED APPLICATIONS

The present application is a continuation of and claims priority to U.S. patent application Ser. No. 14/170,730, filed Feb. 3, 2014, and titled SYSTEMS AND METHODS FOR SYNCHRONIZING DATA BETWEEN COMMUNICATION DEVICES IN A NETWORKED ENVIRONMENT, issued as U.S. Pat. No. 9,413,593 on Aug. 9, 2016, which is a continuation of U.S. patent application Ser. No. 12/724,995, filed Mar. 16, 2010, and titled SYSTEMS AND METHODS FOR SYNCHRONIZING DATA BETWEEN COMMUNICATION DEVICES IN A NETWORKED ENVIRONMENT, issued as U.S. Pat. No. 8,645,541 on Feb. 4, 2014, which is a continuation of U.S. patent application Ser. No. 12/189,267, filed Aug. 11, 2008, and titled SYSTEMS AND METHODS FOR SYNCHRONIZING DATA BETWEEN COMMUNICATION DEVICES IN A NETWORKED ENVIRONMENT, issued as U.S. Pat. No. 7,693,997 on Apr. 6, 2010, which is a continuation of and claims priority to U.S. patent application Ser. No. 10/735,590, filed Dec. 12, 2003 and titled SYSTEMS AND METHODS FOR SYNCHRONIZING DATA BETWEEN COMMUNICATION DEVICES IN A NETWORKED ENVIRONMENT, issued as U.S. Pat. No. 7,426,578 on Sep. 16, 2008, the contents of each of which are hereby incorporated by reference herein in their entirety.

BACKGROUND OF THE INVENTION

1. Field of the Invention

The field of the invention relates generally to network communications and more particularly to synchronizing data shared between a plurality of networked communication devices.

2. Background Information

Networked communication devices often need to share information. For example, the need often arises in networked environments where data on one device needs to be replicated on one or more other devices. It will be understood that even the simple task of sharing data can be problematic in a networked environment; however, problems are further complicated when the data to be shared is dynamic or changing over time in such a way that only the latest set of data is of value. Various approaches exist for accomplishing the replication of dynamic data in a networked environment; however, conventional approaches are limited and often ineffective.

One conventional approach to sharing data in a networked environment uses repositories of data known as buffers on each of the devices. The buffers can then be synchronized by sending messages over a network connection. In order to reduce the amount of data sent and thus the usage of network connection bandwidth, an entire copy of the original, or source buffer, can be sent to one or more destination buffers. Thereafter, only changes in the source buffer are sent at various intervals. The destination device can then apply the changes to its local buffer to maintain synchronization with the source buffer. This approach allows the update interval to be selected to match the desired, or available network bandwidth between the source and receiving device. Selecting the update interval, however, can be problematic.

For example, updates can be sent to a destination device anytime a change is made to the buffer on the source device. But this can be ineffective because the destination device or interconnecting network link may be incapable of accepting and processing the updates at the rate changes occur at the source device. Accordingly, updates must either be discarded, resulting in loss of synchronization, or queued-up, in which case a lag develops between source and destination devices corresponding to the length of the queue. Such loss of synchronization or lag between destination and source devices can lead to problems. Moreover, queues may also consume significant and potentially unbounded resources, leading to further problems.

Alternatively, updates can be sent when requested by the destination device. This allows updates to be sent at a rate that they can be processed, but the receiving buffer is only synchronized with the source buffer at times when an update is sent. Thus, the source buffer may go through several intermediate states in the interval between updates. These intermediate states will not be reflected in the destination buffer.

A further drawback to conventional approaches can occur when a plurality of destination buffers must be synchronized with a source buffer. Often the data handling capability of each destination differs. Further, the network connections between source and each of the destination devices are not necessarily identical in terms of bandwidth, speed, latency, or reliability. As a result, changes sent to the destination devices can be sent only as frequently as can be handled by the slowest connected device or network connection. Accordingly, devices capable of receiving more information or more intermediate states are not able to operate using their full capability.

For example, a multimedia collaboration session, where a user's computer display, or region of the display, is shared with remote viewers, can be used to illustrate the problems with conventional data sharing approaches. The portion of the display to be shared is often captured in a buffer and transmitted to other viewers' computers. As the display changes, the source buffer is updated and updates are sent to destination buffers and displayed on viewers' displays; however, these updates are sent only at the rate corresponding to the slowest of all the connected networks and devices. Accordingly, even users with fast computers will experience less frequent updates and unpleasant artifacts such as jerkiness, low frame rate, and poor quality in displays involving changes or motion.

Alternatively, a separate instance of the source buffer can be maintained for each destination device and separate computation of changes. And update message transmission can be performed for each connected destination device. This technique allows each device to receive updates at a rate that best uses available network and device capabilities; however, this approach suffers from a limitation in that maintaining buffers and computing changes requires large amounts of memory and processing power. Thus, maintaining a separate buffer instance for each connected destination limits the number of endpoints that can be simultaneously connected. This is a serious limitation in a system such as a multimedia collaboration system, which may be of use only if a certain number of parties are able to connect.

Thus, a significant implementation challenge exists in synchronizing multiple destination buffers and devices to a source buffer containing data that changes over time. This is especially true when the data handling capacity of connected destination devices are not equal, as is typical in conventional networked environments. If all destinations devices are sent updates for every change in the source buffer, the volume of data may overwhelm the capacity of some devices and network links, resulting in loss of synchronization for those devices. If data is sent at a rate compatible with all devices, i.e. sent at the rate of the slowest receiving device and network link, devices with greater capability will receive poor quality data. If a separate data stream is created for each connected device, the resources of the sending device may become taxed and the result will be a limit to the number of destination devices that can connect simultaneously.

BRIEF SUMMARY OF THE INVENTION

A source communication device comprises a cluster manager to group destination device connections into a plurality of performance clusters. The cluster manager can then assign a synchronization mechanism to each performance cluster. Each synchronization mechanism can then allow data to be optimally shared between the source device and destination devices within a given performance cluster.

These and other features, aspects, and embodiments of the invention are described below in the section entitled "Detailed Description of the Preferred Embodiments."

BRIEF DESCRIPTION OF THE SEVERAL VIEWS OF THE DRAWING

Features, aspects, and embodiments of the inventions are described in conjunction with the attached drawings, in which.

DETAILED DESCRIPTION OF THE INVENTION

Figure 1:
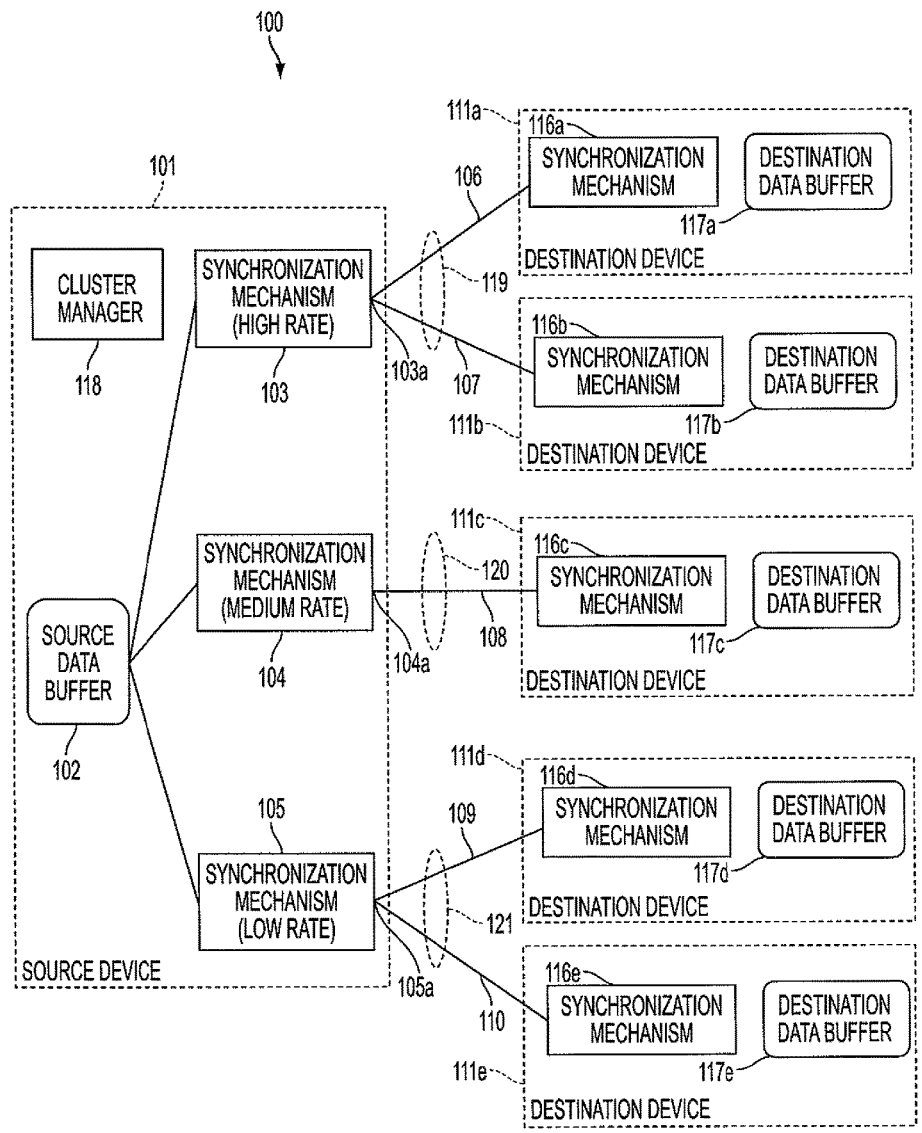
FIG. 1 is a diagram illustrating an example network communication system configured in accordance with one embodiment.

FIG. 1 is a diagram illustrating an example network communication system 100 configured in accordance with one embodiment of the systems and methods described herein. Network communication system 100 comprises a source device 101 interfaced with a plurality of destination devices 111 via connection interfaces 103a, 104a, and 105a and communication connections 106-110. Source device 101 comprises a source data buffer 102 that comprises data to be replicated on each destination device 111, e.g., in an associated destination data buffer 117. Source device 101 can also include one or more synchronization mechanisms, such as synchronization mechanisms 103, 104, and 105, as well as a cluster manager 118. The source data buffer 102 can be coupled directly or indirectly to synchronization mechanisms 103, 104 and 105.

The number of destination devices 111 and the number of associated communication connections are shown for illustration only. Only a small number of connections and destination devices 111 are shown for clarity and should in no way imply a limit or suggestion as to the number of communication devices 111 that can be supported using the systems and methods described herein.

Often, communication connections 106-110 can have different performance capabilities. As described below, performance capability can be defined in a variety of ways, such as the bandwidth capability of each connection. Thus for example, connections 106 and 107 can have a relatively high bandwidth capability, while connection 108 can have a somewhat lower bandwidth capability and connections 109 and 110 can have a still lower bandwidth capability. Accordingly, cluster manager 118 can be configured to group destination devices 111, or communication links 106-110, into performance clusters, e.g., performance clusters 119, 120, and 121, based on their similar performance capabilities. In FIG. 1, performance cluster 119 is shown as a high rate or high performance cluster; performance cluster 120 as shown as a medium rate or intermediate performance cluster; and performance cluster 121 is shown as a low rate or low performance cluster. The number of clusters needed may vary as system requirements dictate. The cluster manager can be further configured to assign a synchronization mechanism 103, 104, or 105 to each of the performance clusters 119, 120, and 121. Synchronization mechanisms 103, 104, or 105 can be configured to then send updates to associated destination devices 111 or associated communication links 106-110 in a manner that is optimized for the performance capabilities of the associated destination devices or communication links 106-110.

Source device 101 can be configured to share data stored in the source data buffer 102 with the plurality of destination devices 111. Communication connections 106-110 provide mechanisms for transferring data, i.e., physical communications channels, while the synchronization mechanisms 103-105 and corresponding synchronization mechanisms 116 associated with destination devices 111 can be configured to provide the computation and protocols needed to share data between source data buffer 102 and destination data buffers 117 over communication connections 106-110.

Figure 2:
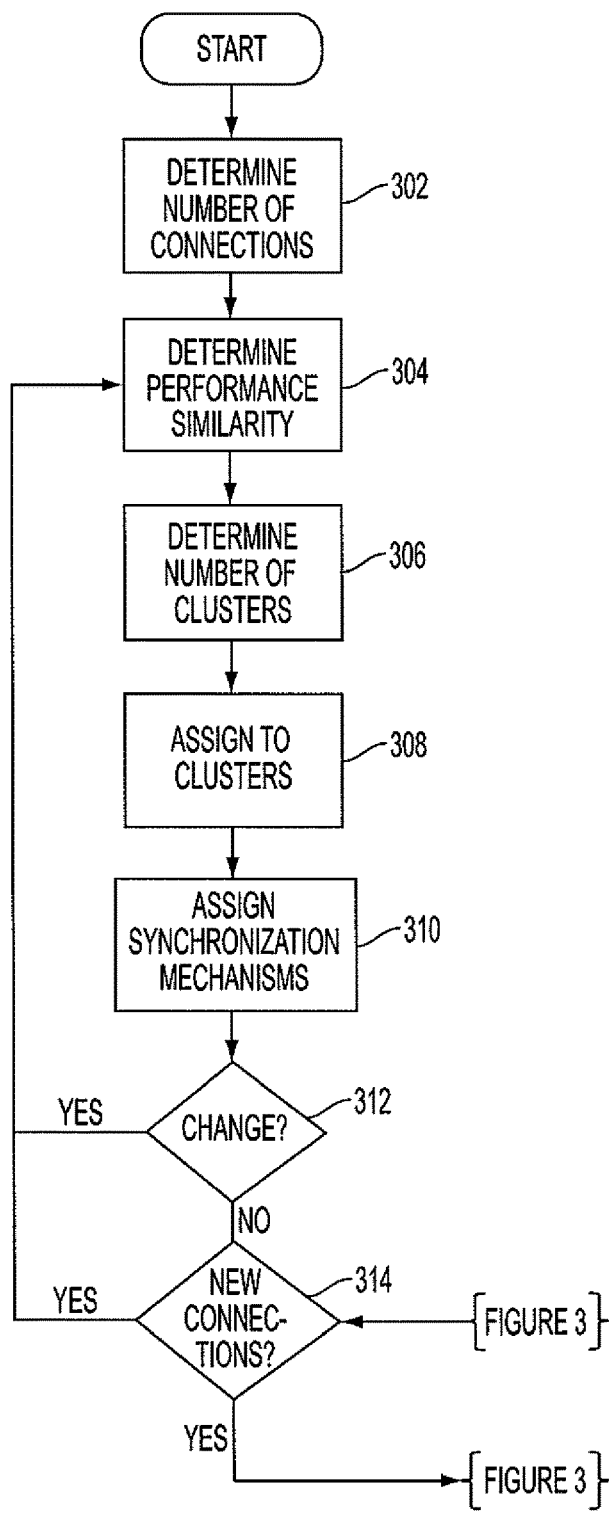
FIG. 2 is a diagram illustrating another example embodiment of a network communication system configured in accordance with one embodiment.

FIG. 2 is a diagram illustrating an example method for generating performance clusters, such as performance clusters 119, 120, and 121, in accordance with one embodiment of the systems and methods described herein. In step 302, the number of communication connections can be determined, e.g., by cluster manager 118. Cluster manager 118 can be configured to then determine, in step 304, the similarity in the performance capabilities of the communication connections. Based on the similarity determined in step 304, cluster manager can be configured to determine a required number of performance clusters in step 306. Cluster manager 118 can be configured to then cause the required number of synchronization mechanisms to be generated, in step 308 and then assign each communication connection to the appropriate performance cluster in step 310.

In one embodiment, the similarity in performance capability of the various communication connections is determined, in step 304, by maintaining statistics for data rate capability of each communication connection. Such statistics can be derived, for example, from observing data transfers between source device 101 and destination devices 111. In another embodiment, connection security associated with each of the communication connections 106-110 can be used to determine similar performance capabilities in step

304. In still another embodiment, the error rate associated with data transfer of each communication connection can be used in step 304. In yet another embodiment, latency associated with data transfer of each communication connection can be used in step 304. In fact, it will be understood that a variety of performance parameters and related information can be used to determine the similarity in the performance capabilities of the various communication connections. Thus, nothing within the specification or the claims that follow should be seen as limiting the systems and methods described herein to the use of any particular parameters or set of parameters.

In one embodiment, the number of synchronization mechanisms can be determined dynamically and can change as needed to accommodate destination devices 111 as they connect with source device 101. Several algorithms can be used in selecting the number of synchronization mechanisms, some of which are described below. This dynamic capability can allow for a trade off between improved client service, which results when there are fewer destination devices 111 per cluster, and reduced server resource usage, which results from having a large amount of clusters. Thus, for example, if there are only a few destination devices 111, or if client service is important, then cluster manager can assign, for example, each destination device 111 to its own synchronization mechanism. On the other hand, if there are a lot of destination devices 111, or if client service is not as important, then cluster manager can assign fewer synchronization mechanisms. Moreover, depending on the embodiment, cluster manager 118 can be configured to dynamically update the destination device groupings and add or remove synchronization mechanisms as required.

Further, in one particular embodiment, the correspondence between a destination device 111 and a particular synchronization mechanism 103, 104, or 105 can also be dynamic. In other words, the corresponding communication connection for a particular destination device 111 can be moved to a different synchronization mechanism if the corresponding performance capabilities change such that a different performance cluster 119, 120, or 121 is more appropriate. Thus, for example, cluster manager 118 can be configured to monitor, in step 312, a set of statistics associated with the performance of each communication connection 106-110 and to detect any change therein. If a significant change is detected, then the statistics can be used to determine if another performance cluster 119, 120, or 121 is more appropriate for the particular destination device 111.

In one embodiment, all connections 106-110 or all destination devices 111 begin a session as part of a primary performance cluster. After a small number of updates the average latency for each destination device 111 or communication connection 106-110 is gathered. Cluster manager 118 can be configured to then perform a cluster division (step 306) to organize destination devices 111 according to their performance levels, e.g., their average latencies. For example, an initial calculation of the average latencies for each of the plurality of connections can be performed and used to determine the mean latency for the primary performance cluster. A standard deviation relative to the mean can also be calculated. The number of performance clusters required can then be determined based on the percentage of communication connections 106-110 with latencies within a certain number of standard deviations from the mean.

In one particular embodiment, a minimum standard deviation threshold can be used in order to prevent the creation of extra clusters when the performance level is very similar.

Further, in one embodiment, communication connections 106-110 can be placed into an appropriate performance cluster (step 308) using an algorithm, such as the K-means algorithm. The K-means algorithm is a partitioning method based on minimizing the sum-of-squares distance between average latencies for each communication connection 106-110 and the mean latency for the primary performance cluster, allowing division of communication connections 106-110 into (K) performance clusters. This is an iterative approach that maximizes the ratio of variation between performance clusters relative to the variation within a performance cluster. This approach allows a quick calculation with a resulting distinct separation of performance levels. Depending on the embodiment, the K-means algorithm is executed periodically or as needed, e.g., if there is a change in performance capabilities (step 312) or a new destination device 111 joins the session (step 314).

In step 314, the cluster manager 118 can monitor the communication connections 106-110 to detect new connection, i.e., a communication connection that is established after a session has begun. The cluster manager 118 can determine the performance capabilities of the new connection and add the new connection to a performance cluster based upon the performance capabilities of the new connection. In one embodiment, such communication connections will be inserted into a performance cluster (step 308) without moving other communication connections at least until some initial lag statistics are computed for the new communication connection. The new communication connection can, for example, then be moved into a performance cluster based on, e.g., a least squares analysis.

A new insertion into a performance cluster can require a resynchronization for destination devices 111 within the performance cluster on the next cluster-wide update. In one embodiment, only the newly added destination device 111 need be resynchronized while the other destination devices 111 remain synchronized.

Figure 3:
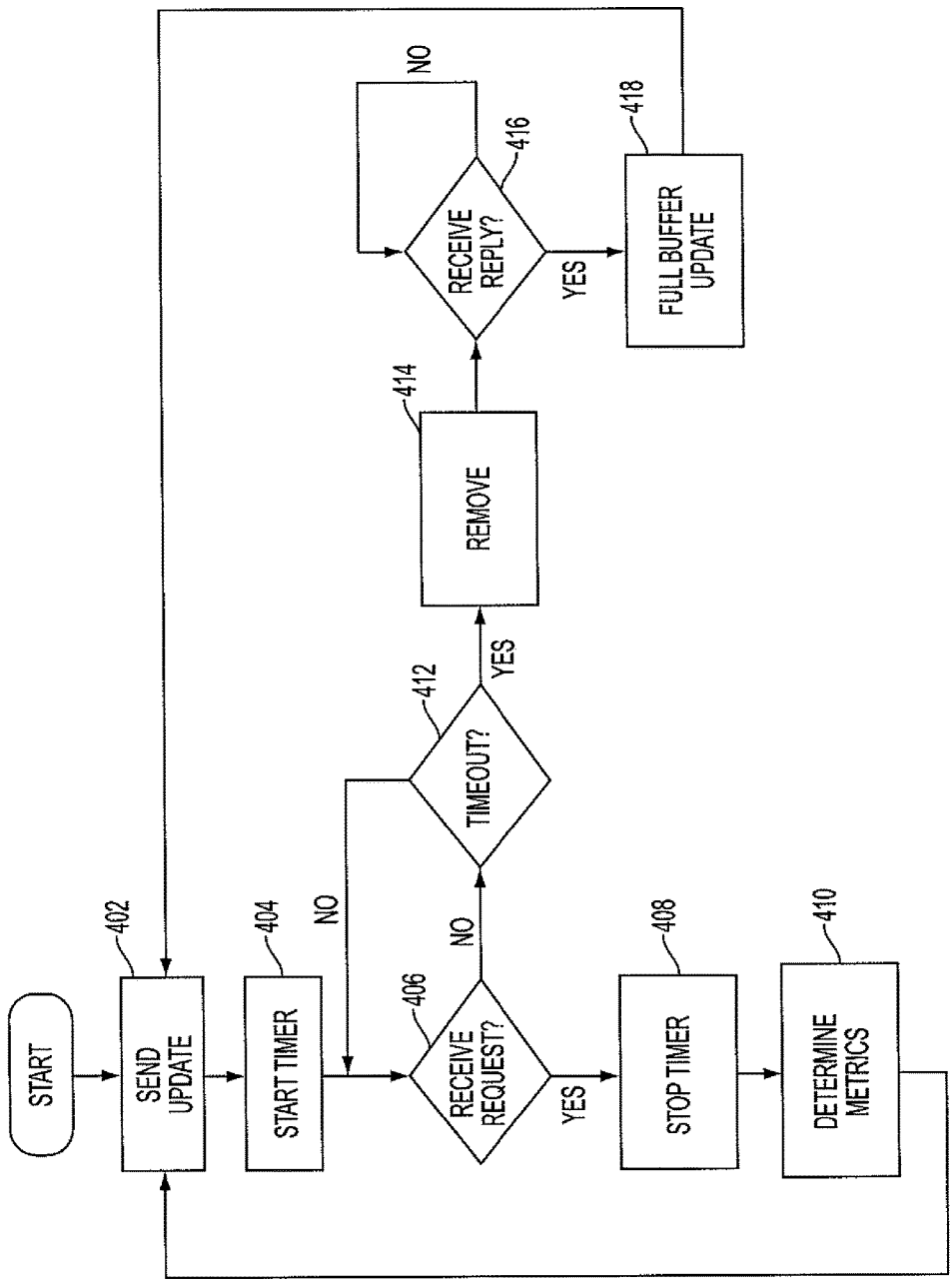
FIG. 3 is a flow chart illustrating an example method for configuring performance clusters within a source device included in the network communication system of FIG. 1 in accordance with one embodiment.

FIG. 3 is a flow chart illustrating an exemplary method for updating destination data buffers 117 associated with a particular performance cluster 119-121 in accordance with one embodiment of the systems and methods described herein. Thus, in step 402, an update can be sent using a synchronization mechanism 103, 104, or 105. When the update is sent in step 402, a timer can then be started, in step 404, In step 406, the associated communication connections are monitored until one of the associated destination devices, requests another update. When another request is received the timer is stopped in step 408. The timer value can then be used to determine the latency associated with the communication connection for the requesting destination device 111. For each destination device 111 two metrics can be determined and maintained in step 410. The two metrics can include a "Total Session Average Latency" and a "Recent Average Latency." The "Total Session Latency" can be an average of all latency values associated with the requesting destination device 111. The "Recent Average Latency" can be an average of some number of the most recent latency values for the requesting destination device 111.

A destination device 111 that does not respond within a timeout threshold, as determined in step 412, can be removed from its performance cluster, in step 414, so that other destination devices 111 in the performance cluster can still receive updates. This can, for example, prevent a network interruption or an issue associated with a destination device 111 from harming the other cluster participants' experiences. If a destination device 111 has reached this timeout, in step 412, but eventually responds, in step 416, then it can still be allowed to receive full-buffer updates, in step 418, e.g., until its Recent Average Latency performance merits insertion back into one of the performance clusters 119-121.

In one embodiment, the synchronization mechanisms 103-105 and the synchronization mechanisms 116 can be configured to operate by dividing the data in source data buffer 102 into a number of blocks or sections. Initially, or whenever synchronization is lost, a complete set of all blocks can be sent from source device 101 to a destination device 111. The associated destination device buffer 117 can then be updated using the complete set of blocks so that it is a replica of the source data buffer 102. Subsequently source device 101 can send only blocks that have changed subsequent to the last update sent to the destination data buffer 117. This approach can, for example, result in considerable savings in network bandwidth.

In one embodiment, updates are sent when all connected devices in a cluster have requested an update.

Figure 4:
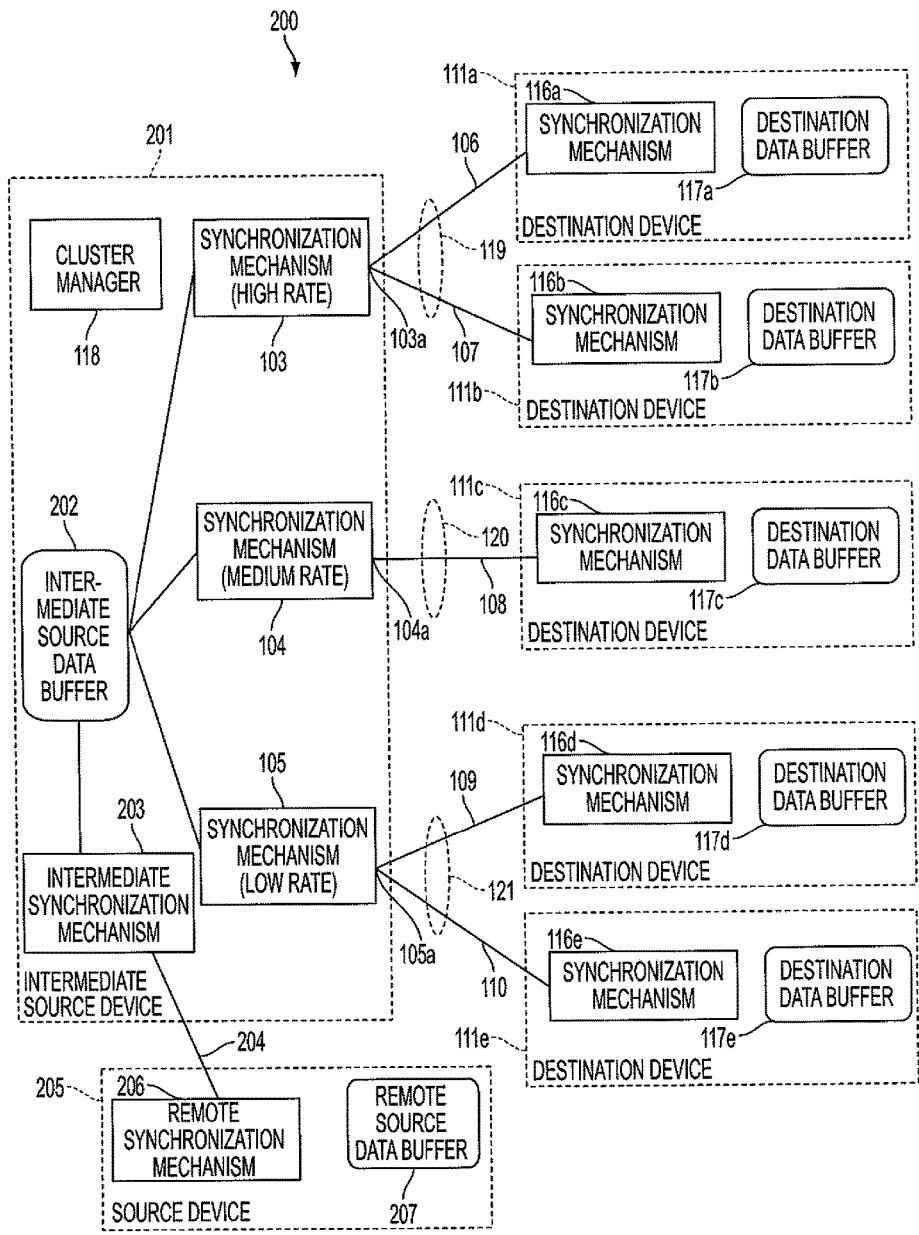
FIG. 4 is a flow chart illustrating an example method for synchronously sharing data using performance clusters established using the method of FIG. 3 in accordance with one embodiment.

It should be noted that the original source data buffer can be located on a remote source device, e.g., a device that is not immediately connected with destination devices 111. For example, FIG. 4 is a diagram illustrating an example network communication system 200, which comprises a remote source device 205, with remote source data buffer 207, in accordance with one embodiment of the systems and methods described herein. Remote source device 205 can be interfaced with destination devices 111 via an intermediate source device 201. Thus, intermediate source device 201 can comprise a cluster manager 118, which can be configured to group communication connections 106-110 into performance clusters 119-121 using synchronization mechanisms 103-105.

In addition, intermediate source device 201 can comprise an intermediate source data buffer 202, which can be kept in synchronization with remote source data buffer 207 using synchronization mechanisms 203 and 205. Destination data buffers 117 can then be kept in synchronization with intermediate source data buffer 202 as described above in relation to source data buffer 102.

In one example of FIG. 4, synchronization mechanism 103 can be configured to provide updates to performance cluster 119, which comprises the highest data rate destination devices 111 and communication connections 106 and 107. The update interval required by synchronization mechanism 103 can thus determine the highest update rate needed and can therefore also serve as the update interval used by synchronization mechanisms 203 and 205 for updating intermediate source data buffer 202. This approach can be used to avoid redundant or excessive data requests for communication connection 204.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A device, comprising:
a processor and a memory unit; and
a cluster manager to enable the device to operate as a source device of a cluster, the cluster manager structured to remove one or more of a plurality of communication connections associated respectively with a plurality of destination devices that do not respond within a timeout threshold from the cluster formed with the source device, wherein the source device is structured to share data stored in a source data buffer of the source device with the plurality of destination devices via the plurality of communication connections to replicate the data onto destination data buffers on each of the plurality of destination devices respectively, and when the removed one or more destination devices respond to the timeout threshold, detect a new connection, determine a performance of the new connection, and add the new connection to a cluster based on the performance of the new connection;
wherein the cluster manager is further structured to provide the removed one or more of the plurality of destination devices full-buffer updates until a recent average latency performance of the removed one or more destination devices is at a level that merits insertion back into one of the clusters.

2. The device of claim 1, wherein the cluster manager is structured to group a plurality of connections between the source device and a plurality of destination devices into clusters based on at least one of performance similarities, client service priorities, and resource priorities.

3. The device of claim 1, further comprising a plurality of connection interfaces, wherein the source device is interfaced with the plurality of destination devices via the plurality of connection interfaces and the plurality of communication connections.

4. The device of claim 3, wherein the source data buffer is configured to store data, and wherein the source device is structured to share the data stored in the source data buffer with the plurality of destination devices interfaced with the source device via the plurality of connection interfaces.

5. The device of claim 3, further comprising a plurality of synchronization mechanisms coupled with the plurality of connection interfaces, wherein the cluster manager is configured to assign a synchronization mechanism to each of the clusters.

6. The device of claim 5, wherein each of the plurality of synchronization mechanisms is configured to provide computations and protocols needed to communicate data over the plurality of connections.

7. The device of claim 1, wherein the cluster manager is configured to at least one of create fewer clusters when it is determined that resource priorities are a priority and create more clusters when it is determined that client service is a priority.

8. The device of claim 1, wherein the cluster manager is further configured to detect a change in performance capabilities for one of the plurality of connections and to assign a connection for the one of the plurality of connections to another cluster based on the change in performance capabilities.

9. A system, comprising:
a processor and a memory unit;
an intermediate source device configured to share data stored in an intermediate source data buffer of the intermediate source device with one or more destination devices to replicate the data onto destination data buffers on each of the one or more destination devices respectively, wherein the intermediate source device comprises:
a cluster manager configured to remove one or more destination devices that do not respond within a timeout threshold from a distinct cluster formed with the intermediate source device, but when the removed one or more destination devices respond to the timeout threshold, detect a change in performance capabilities for a connection in one cluster and to assign the connection to another cluster based on the change in performance capabilities;

wherein the removed one or more destination devices receive full-buffer updates until a recent average latency performance of the removed one or more destination devices is at a level that merits insertion back into the distinct cluster.

10. The system of claim 9, wherein the cluster manager is configured to determine subsets of connections from a set of connections and group each of the subsets in the distinct cluster, wherein each connection in each subset has similar performance capabilities with the other connections in the same subset.

11. The system of claim 10, wherein the performance capabilities are based on at least one of performance similarities, client service priorities, and resource priorities.

12. The system of claim 11, wherein the performance similarities for each subset of connections is determined by a similarity in connection bandwidth.

13. The system of claim 11, wherein the performance similarities for each subset of connections is determined by a similarity in connection security.

14. The system of claim 11, wherein the performance similarities for each subset of connections is determined by a similarity in connection error rate.

15. The system of claim 9, further comprising a plurality of synchronization mechanisms, wherein the cluster manager is configured to assign a synchronization mechanism to each distinct cluster.

16. The system of claim 15, wherein each of the plurality of synchronization mechanisms is configured to provide computations and protocols needed to communicate data over the set of connections.

17. A device, comprising:

a processor and a memory unit;

the processor structured to remove one or more of a plurality of destination devices that do not respond within a timeout threshold from a cluster formed with a source device configured to share data stored in a source data buffer of the source device with the plurality of destination devices to replicate the data onto destination data buffers on each of the plurality of destination devices respectively, and when the removed one or more destination devices respond to the timeout threshold, detect a new connection, determine a performance of the new connection, and add the new connection to a cluster based on the performance of the new connection;

wherein the processor is further structured to provide the removed one or more of the plurality of destination devices full-buffer updates until a recent average latency performance of the removed one or more destination devices is at a level that merits insertion back into one of the clusters.

* * * * *